(12) United States Patent
Chen

(10) Patent No.: US 10,156,437 B2
(45) Date of Patent: Dec. 18, 2018

(54) CONTROL METHOD OF A DEPTH CAMERA

(71) Applicants: LITE-ON ELECTRONICS (GUANGZHOU) LIMITED, Guangzhou (CN); LITE-ON TECHNOLOGY CORP., Taipei (TW)

(72) Inventor: Jau-Yu Chen, Taipei (TW)

(73) Assignees: Lite-On Electronics (Guangzhou) Limited, Guangzhou (CN); Lite-On Technology Corp., Taipei (TW)

(*) Notice: Subject to any disclaimer, the term of this patent is extended or adjusted under 35 U.S.C. 154(b) by 316 days.

(21) Appl. No.: 14/881,301

(22) Filed: Oct. 13, 2015

(65) Prior Publication Data

US 2016/0330434 A1     Nov. 10, 2016

(30) Foreign Application Priority Data

May 8, 2015   (CN) .......................... 2015 1 0230932

(51) Int. Cl.
| | | |
|---|---|---|
| G06T 7/55 | (2017.01) | |
| G01B 11/25 | (2006.01) | |
| G06T 7/521 | (2017.01) | |
| H04N 13/239 | (2018.01) | |
| H04N 13/271 | (2018.01) | |

(52) U.S. Cl.
CPC .......... *G01B 11/2513* (2013.01); *G06T 7/521* (2017.01); *G06T 7/55* (2017.01); *H04N 13/239* (2018.05); *H04N 13/271* (2018.05); *G06T 2207/10024* (2013.01); *G06T 2207/10048* (2013.01); *G06T 2207/20221* (2013.01)

(58) Field of Classification Search
CPC .................... G06T 7/0051; G06T 7/50; G06T 2207/10028; G01B 11/2513
See application file for complete search history.

(56) References Cited

U.S. PATENT DOCUMENTS

| | | | | |
|---|---|---|---|---|
| 9,454,820 | B1* | 9/2016 | Kirmani | H04N 7/18 |
| 9,489,745 | B1* | 11/2016 | Heitz, III | G06T 7/20 |
| 2012/0236121 | A1* | 9/2012 | Park | H04N 13/271 348/46 |
| 2015/0256813 | A1* | 9/2015 | Dal Mutto | G06K 9/2036 348/47 |
| 2016/0026253 | A1* | 1/2016 | Bradski | G02B 27/225 345/8 |
| 2016/0247101 | A1* | 8/2016 | Agrawal | G06K 9/00771 |
| 2016/0255334 | A1* | 9/2016 | Wajs | G06T 7/593 382/154 |
| 2016/0300361 | A1* | 10/2016 | Xie | G06T 7/2033 |
| 2016/0366346 | A1* | 12/2016 | Shin | H04N 5/33 |

* cited by examiner

*Primary Examiner* — Joseph G Ustaris
*Assistant Examiner* — Jill D Sechser
(74) *Attorney, Agent, or Firm* — Rosenberg, Klein & Lee

(57) ABSTRACT

A control method of a depth camera includes controlling first and second image sensors to detect light in a first wavelength range, generating a first depth map based on first and second images, subjecting one of the first and second images to edge-detection processing, controlling a light source to emit light in a second wavelength range when a number of edge pixels is determined to be smaller than a preset pixel number, controlling the second image sensor to detect light in the second wavelength range, generating a second depth map based on a third image, subjecting the first and the second depth maps to image fusion processing, and registering a fused depth map with one of the first and second images to generate 3D point cloud data.

6 Claims, 3 Drawing Sheets

1

CONTROL METHOD OF A DEPTH CAMERA

CROSS-REFERENCE TO RELATED APPLICATION

This application claims priority of Chinese Patent Application No. 201510230932.X, filed on May 8, 2015.

FIELD

The disclosure relates to a control method of a depth camera, more particularly to a control method of a depth camera for generation of three-dimensional point cloud data.

BACKGROUND

One type of current depth camera is a structured light depth camera, which utilizes an infrared light source to emit patterned infrared light forming specific patterns when reaching an object surface, and utilizes an infrared sensor to detect reflected infrared light from the object surface for generation of an infrared image. The depth camera subsequently obtains a depth map by analyzing the infrared image. The structured light depth camera has an advantage that the depth map obtained thereby is relatively accurate. However, when objects in a field of view of the depth camera is far away from the depth camera, operational power of the infrared light emission is required to be increased so as to ensure successful reflection of the patterned infrared light by the object back to the structured light depth camera. Therefore, a drawback of higher power consumption is inevitable.

Another type of current depth camera is a stereoscopic depth camera, which utilizes two color sensors for generation of color images at different angles of view and which obtains a depth map by analyzing the color images thus generated. Since the stereoscopic depth camera is not required to emit infrared light, power consumption of the stereoscopic depth camera is smaller than that of the structured light depth camera. However, when a feature of a large plane is in the field of view of the stereoscopic depth camera, the number of edge pixels obtained from the color images which are captured by the stereoscopic camera is insufficient for effectively discerning a distance between the feature and the stereoscopic depth camera.

SUMMARY

Therefore, an object of the disclosure is to provide a control method of a depth camera which overcomes the aforementioned drawbacks.

Accordingly, the control method of a depth camera is disclosed. The depth camera includes a light source, a first image sensor unit and a second image sensor unit which are spaced apart from each other and which have overlapping field of view, and a processor which is connected electrically to the light source, the first image sensor unit and the second image sensor unit. The first image sensor unit detects light in a first range of wavelengths. The second image sensor unit detects light in the first range of wavelengths as well as light in a second range of wavelengths different from the first range of wavelengths. The light source emits light in the second range of wavelengths. The control method includes the following steps:

controlling, by the processor, each of the first image sensor unit and the second image sensor unit to detect light in the first range of wavelengths for generation of a respective one of a first image by the first image sensor unit and a second image by the second image sensor unit;

generating, by the processor, a first depth map based on the first image and the second image;

subjecting, by the processor, one of the first image and the second image to an edge-detection processing so as to obtain a number of edge pixels of said one of the first image and the second image which has undergone the edge-detection processing;

determining, by the processor, whether the number of edge pixels is smaller than a first preset pixel number;

controlling, by the processor, the light source to emit light when it is determined that the number of edge pixels is smaller than the first preset pixel number;

controlling, by the processor, the second image sensor unit to detect light in the second range of wavelength for generation of a third image by the second image sensor unit;

generating, by the processor, a second depth map based on the third image;

subjecting, by the processor, the first depth map and the second depth map to an image fusion processing so as to obtain a fused depth map; and registering, by the processor, the fused depth map with one of the first image and the second image so as to generate three-dimensional point cloud data.

An effect of the disclosure resides in that, by determining the number of the edge pixels and the depth representative value, whether to generate the second depth map and a suitable driving current for the light source may be determined, so as to prevent high power consumption while maintaining accurate acquisition of depth information.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
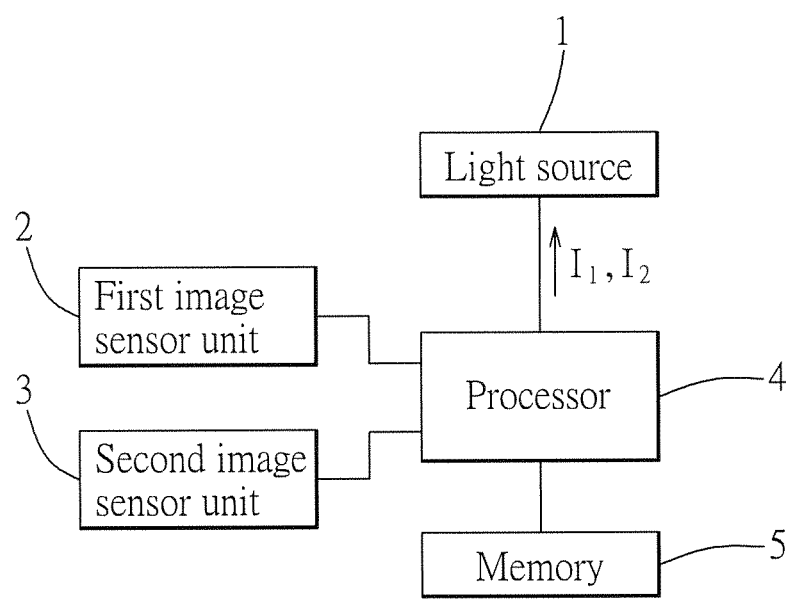
FIG. 1 is a block diagram illustrating hardware elements of a depth camera.
Figure 2A:
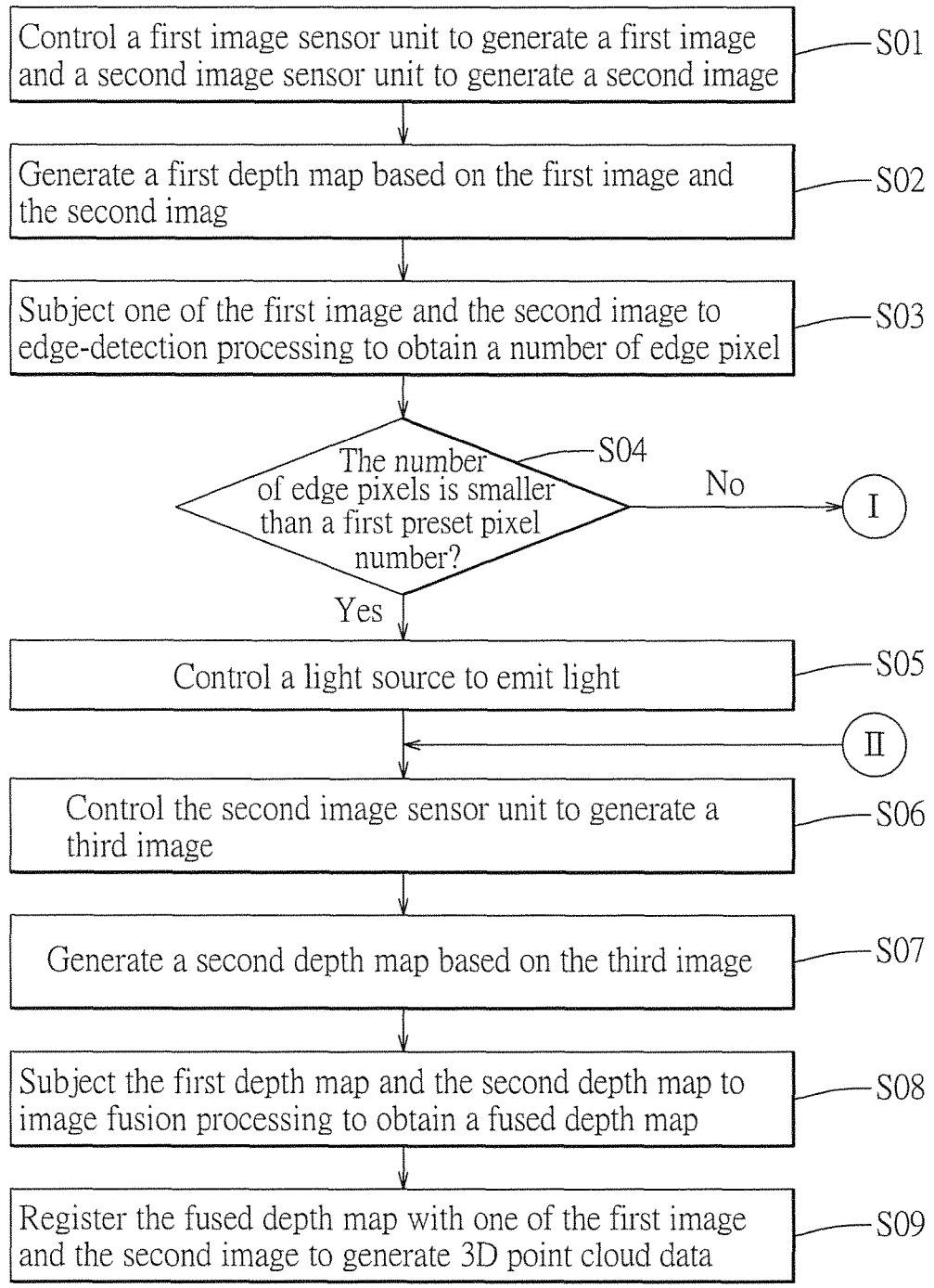
FIGS. 2A and 2B cooperatively constitute a flow chart of an embodiment of a control method of the depth camera of FIG. 1 according to the disclosure.
Figure 2B:
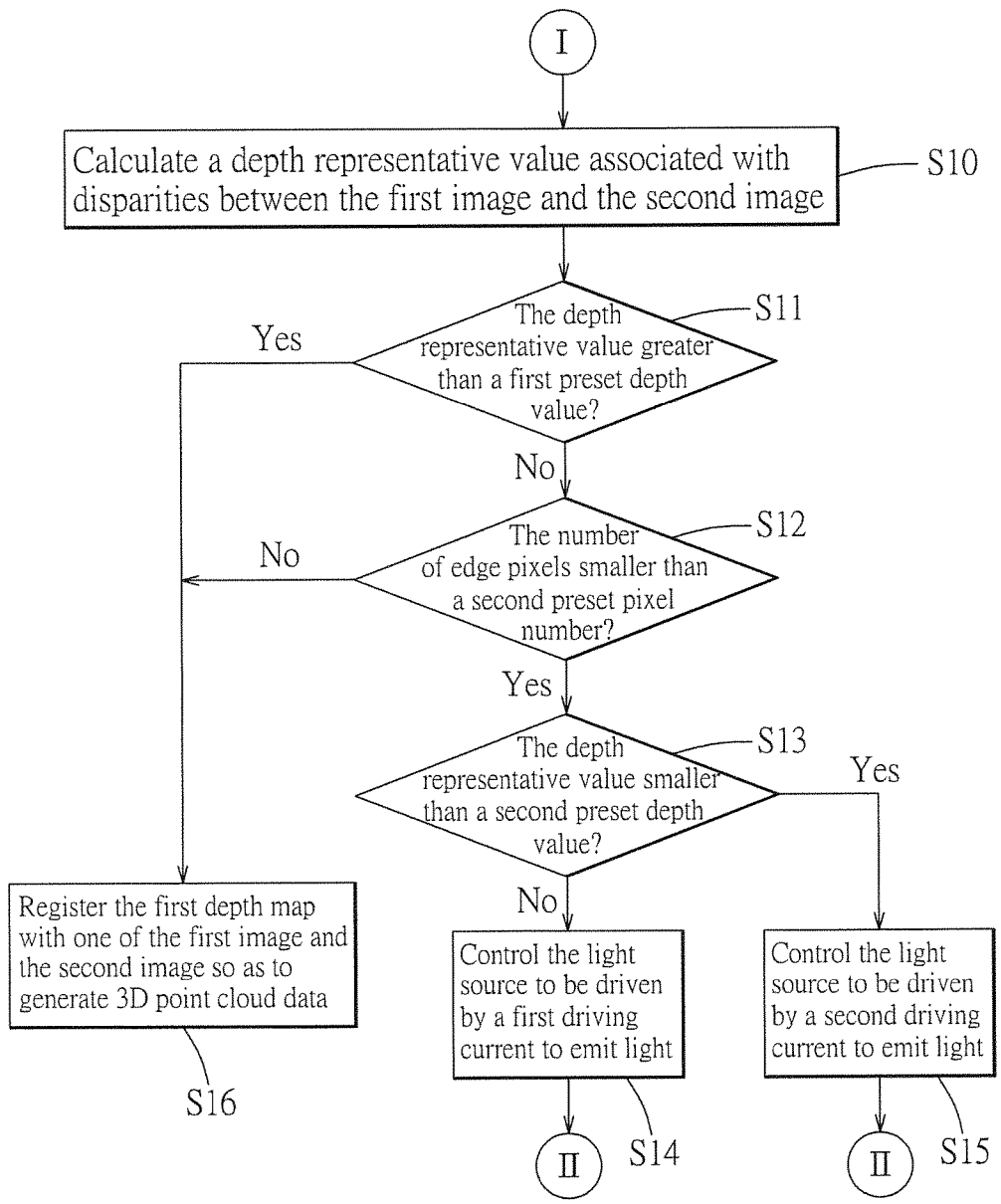

Referring to FIG. 1 and FIGS. 2A-2B, an embodiment of a control method of a depth camera according to the disclosure is illustrated. The depth camera includes a light source 1, a first image sensor unit 2 and a second image sensor unit 3 which are spaced apart from each other and which have overlapping field of view, a memory 5, and a processor 4 which is connected electrically to the light source 1, the first image sensor unit 2, the second image sensor unit 3 and the memory 5.

The first image sensor unit 2 is adapted to detect light in a first range of wavelengths. The second image sensor unit 3 is adapted to detect light in the first range of wavelengths as well as light in a second range of wavelengths different from the first range of wavelengths. The light source 1 emits light in the second range of wavelengths. In this embodiment, the light in the first range of wavelengths is visible light, the light in the second range of wavelengths is invisible light, and the light emitted by the light source 1 is infrared light, falling within the second range of wavelengths. Specifically, the first image sensor unit 2 of this embodiment includes an RGB (red, green, blue) sensor which is capable of detecting light in the first range of wavelengths, and the second image sensor unit 3 of this embodiment includes an RGB-IR (red, green, blue, infrared) sensor which is capable of detecting light in the first range of wavelengths and light in the second range of wavelengths. In another embodiment, the first image sensor unit 2 includes an RGB sensor which is capable of detecting light in the first range of wavelengths, and the second image sensor unit 3 includes an RGB sensor which is capable of detecting light in the first range of wavelengths and an IR sensor which is capable of detecting light in the second range of wavelengths.

The memory 5 stores a first preset pixel number, a second preset pixel number which is greater than the first preset pixel number, a first preset depth value, and a second preset depth value which is smaller than the first preset depth value.

The control method of a depth camera according to the disclosure includes the following steps.

In step S01, the processor 4 is programmed to control each of the first image sensor unit 2 and the second image sensor unit 3 to detect light in the first range of wavelengths for generation of a respective one of a first image by the first image sensor unit 2 and a second image by the second image sensor unit 3.

In step S02, the processor 4 is programmed to generate a first depth map based on the first image and the second image.

In step S03, the processor 4 is programmed to subject one of the first image and the second image to edge-detection processing so as to obtain a number of edge pixels of said one of the first image and the second image which has undergone the edge-detection processing.

In step S04, the processor 4 is programmed to determine whether the number of edge pixels is smaller than the first preset pixel number. When it is determined that the number of edge pixels is smaller than the first preset pixel number, the flow proceeds to step S05. Otherwise, step S10 is performed.

In step S05, the processor 4 is programmed to control the light source 1 to emit light.

In step S06, the processor 4 is programmed to control the second image sensor unit 3 to detect light in the second range of wavelengths for generation of a third image by the second image sensor unit 3.

In step S07, the processor 4 is programmed to generate a second depth map based on the third image. In this embodiment, the light source 1 is capable of emitting patterned infrared light, also known as structured light, which has specific patterns when reaching an object surface. When objects in the field of view of the depth camera at different distances away from the depth camera are illuminated by the patterned infrared light, the specific patterns projected onto the objects may be deformed to have distinct shapes. The processor 4 is programmed to compare the specific patterns which are deformed to have distinct shapes in the third image with at least one reference pattern which is stored in advance in the memory 5, so as to obtain the second depth map.

In step S08, the processor 4 is programmed to subject the first depth map and the second depth map to image fusion processing so as to obtain a fused depth map.

In step S09, the processor 4 is programmed to register the fused depth map with one of the first image and the second image so as to generate three-dimensional (3D) point cloud data. Since steps S05 to S09 are performed by the depth camera when the number of edge pixels is determined to be smaller than the first preset pixel number, the depth camera is able to generate the second depth map with higher accuracy when the first depth map is found to have insufficient accuracy. Subsequently, the second depth map is fused with the first depth map through image fusion processing, so as to maintain accuracy of depth detection of the depth camera.

On the other hand, when a result of the determination made in step S04 is negative, that is to say when the processor 4 determines that the number of edge pixels is not smaller than the first preset pixel number, step S10 is performed by the depth camera.

In step S10, the processor 4 is programmed to calculate a depth representative value which is associated with disparities between the first image and the second image. Specifically, there exists disparity of features between the first image and the second image. The processor 4 is able to calculate depth values based on the disparity of features, respectively. In one exemplary approach, for each of the disparity of features, a reciprocal of a disparity is multiplied by a distance between optical centers of the first image sensor unit 2 and the second image sensor unit 3, is then multiplied by a focal length of one of the first image sensor unit 2 and the second image sensor unit 3, and is subsequently divided by image resolution of said one of the first image sensor unit 2 and the second image sensor unit 3, so as to obtain the depth value. The processor 4 subsequently calculates the depth representative value based on a plurality of depth values obtained through the aforementioned approach. In this embodiment, the depth representative value is an average of the plurality of depth values. However, in another embodiment, the depth representative value is not limited to the disclosure herein, and may be a median of the plurality of depth values.

In step S11, the processor 4 is programmed to determine whether the depth representative value thus calculated is greater than the first preset depth value. When it is determined that the depth representative value thus calculated is greater than the first preset depth value, the flow proceeds to step S16, and otherwise, step S12 is performed.

In step S16, the processor 4 is programmed to refrain from controlling the light source 1 to emit light. The processor 4 is subsequently programmed to register the first depth map with one of the first image and the second image so as to generate 3D point cloud data. Since the processor 4 directly registers the first depth map with one of the first image and the second image without generating the second depth map when the depth representative value is greater than the first preset depth value, a situation in which if most of objects in the field of view of the depth camera are distant from the depth camera, the light source 1 of the depth camera operates at high power to result in higher power consumption may be prevented.

In step S12, the processor 4 is programmed to determine whether the number of edge pixels is smaller than the second preset pixel number when it is determined that the depth representative value is not greater than the first preset depth value. If a result of this determination is affirmative, the flow proceeds to step S13, and otherwise, step S16 is performed. That is to say, when the processor 4 determines that the number of the edge pixels is not smaller than the second preset pixel number, the processor 4 prevents the light source 1 from emitting light, and registers the first depth map with one of the first image and the second image so as to generate the 3D point cloud data. In this way, when the edge pixels are sufficient in number to ensure a highly accurate first depth map, the processor 4 directly registers the highly accurate first depth map with said one of the first image and the second image without generation of the second depth map, so as to save power to be consumed for generating the second depth map.

On the other hand, in step S13, the processor 4 is programmed to determine whether the depth representative value thus calculated is smaller than the second preset depth value. If a result of this determination is affirmative, the flow proceeds to step S15, and otherwise, step S14 is performed.

In step S14, the processor 4 is programmed to control the light source 1 to be driven by a first driving current $I_1$, which is positively proportional to the depth representative value, to emit light. A positively proportional relationship means: the greater the depth representative value, the higher the first driving current $I_1$; and the smaller the depth representative value, the lower the first driving current $I_1$. Subsequent to step S14, the flow proceeds back to step S06, and steps S07 to S09 are performed afterward. In this manner, when the objects in the field of view of the depth camera is neither far away from nor too close to the depth camera, and when the accuracy of the first depth map (which is associated with the number of edge pixels) is neither high nor low, the depth camera adjusts operational power of the light source 1 according to the distance between the objects and the depth camera (i.e., the depth representative value) for generation of the second depth map, and subjects the first depth map and the second depth map to image fusion processing, so as to maintain accuracy of depth detection of the depth camera while maintaining power consumption of the light source 1 at a reasonable level.

On the other hand, when it is determined that the depth representative value is smaller than the second preset depth value, in step S15, the processor 4 is programmed to control the light source to be driven by a second driving current $I_2$, which is not greater than a minimum of the first driving current $I_1$, to emit light. In this embodiment, the first driving current $I_1$ and the second driving current $I_2$ are generated by the processor 4. Alternatively, the first driving current $I_1$ and the second driving current $I_2$ may be generated by a driver circuit of the depth camera (not shown) which is controlled by the processor 4. The flow then proceeds to step S06, and steps S07 to S09 are performed afterward. Accordingly, when the objects in the field of view of the depth camera are very close to the depth camera, and when the accuracy of the first depth map is neither high nor low, the depth camera controls the light source 1 to emit light with minimum operational power for generation of the second depth map, and subjects the first depth map and the second depth map to image fusion processing, so as to maintain accuracy of depth detection of the depth camera while keeping power consumption of the light source 1 relatively low.

For example, the first preset pixel number is set to 5000, the second preset pixel number is set to 20000, the first preset depth value is set to 10 meters, and the second preset depth value is set to 0.5 meters. In a first scenario where the number of edge pixels obtained by the processor 4 is 2000, since the number of edge pixels is smaller than the first preset pixel number, after the determination in step S04 has been made, steps S05 to S09 are performed by the depth camera.

Moreover, in a second scenario where the number of edge pixels obtained by the processor 4 is 12000 and the depth representative value calculated thereby is 1000 meters, since the number of edge pixels is not smaller than the first preset pixel number and since the depth representative value is greater than the first preset depth value, after the determinations in steps S04 and S11 have been made, step S16 is performed by the depth camera.

In a third scenario where the number of edge pixels obtained by the processor 4 is 50000 and the depth representative value calculated thereby is 0.7 meters, since the number of edge pixels is not smaller than the first preset pixel number and the second preset pixel number and since the depth representative value is not greater than the first preset depth value, after the determinations in steps S04, S11 and S12 have been made, step S16 is performed by the depth camera.

In a fourth scenario where the number of edge pixels obtained by the processor 4 is 10000 and the depth representative value calculated thereby is 0.7 meters, since the number of edge pixels falls between the first preset pixel number and the second preset pixel number and since the depth representative value falls between the first preset depth value and the second preset depth value, after the determinations in steps S04, S11, S12 and S13 have been made, the flow proceeds to step S14 and steps S06 to S09 are performed afterward by the depth camera.

In a fifth scenario where the number of edge pixels obtained by the processor 4 is 8000 and the depth representative value calculated thereby is 0.3 meters, since the number of edge pixels falls between the first preset pixel number and the second preset pixel number and since the depth representative value is smaller than the second preset depth value, after the determinations in steps S04, S11, S12 and S13 have been made, the flow proceeds to step S15 and steps S06 to S09 are performed afterward by the depth camera.

To sum up, by virtue of determining the number of edge pixels and the depth representative value, the control method of a depth camera according to this disclosure is capable of deciding whether to generate the second depth map and, in certain cases, how much operational power should be supplied to the light source 1, so as to prevent unnecessary power consumption while maintaining high accuracy of depth detection of the depth camera.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control method of a depth camera, the depth camera including a light source, a first image sensor unit and a second image sensor unit which are spaced apart from each other and which have overlapping field of view, and a processor which is connected electrically to the light source, the first image sensor unit and the second image sensor unit, the first image sensor unit detecting light in a first range of wavelengths, the second image sensor unit detecting light in the first range of wavelengths and light in a second range of wavelengths different from the first range of wavelengths, the light source emitting light in the second range of wavelengths, the control method comprising:

controlling, by the processor, each of the first image sensor unit and the second image sensor unit to detect light in the first range of wavelengths for generation of a respective one of a first image by the first image sensor unit and a second image by the second image sensor unit, wherein the light in the first range of wavelengths is visible light;

generating, by the processor, a first depth map based on the first image and the second image corresponding to visible light;

executing the processor to apply edge-detection processing to one of the first image and the second image to obtain a number of edge pixels of said one of the first image and the second image which has undergone the edge-detection processing;

determining, by the processor, whether the number of edge pixels is smaller than a first preset pixel number;

controlling, by the processor, the light source to emit light to reach an object when it is determined that the number of edge pixels is smaller than the first preset pixel number, wherein the light emitted by the light source is infrared light;

controlling, by the processor, the second image sensor unit to detect light in the second range of wavelengths for generation of a third image by the second image sensor unit, wherein the light in the second range of wavelengths is invisible light;

generating, by the processor, a second depth map based on the third image corresponding to invisible light;

executing the processor to apply image fusion processing to the first depth map and the second depth map to obtain a fused depth map; and registering, by the processor, the fused depth map with one of the first image and the second image to generate three-dimensional point cloud data, wherein operational power of the emitted infrared light is selectively adjusted responsive to analysis of the first and second images, and the operational power of the emitted infrared light is adjusted according to a distance between the object and the depth camera when the operational power of the emitted infrared light is adjusted for generation of the second depth map.

2. The control method according to claim 1, wherein controlling the light source to emit light includes controlling, by the processor, the light source to emit patterned infrared light.

3. The control method according to claim 1, subsequent to determining whether the number of edge pixels is smaller than a first preset pixel number, further comprising:

calculating, by the processor, a depth representative value associated with disparities between the first image and the second image when it is determined that the number of edge pixels is not smaller than the first preset pixel number;

determining, by the processor, whether the calculated depth representative value is greater than a first preset depth value;

determining, by the processor, whether the number of edge pixels is smaller than a second preset pixel number, which is greater than the first preset pixel number, when it is determined that the depth representative value is not greater than the first preset depth value;

determining, by the processor, whether the calculated depth representative value is smaller than a second preset depth value, which is smaller than the first preset depth value, when it is determined that the number of edge pixels is smaller than the second preset pixel number; and controlling, by the processor, the light source to be driven by a first driving current, which is positively proportional to the depth representative value, to emit light when it is determined that the depth representative value is not smaller than the second preset depth value, and proceeding to controlling the second image sensor unit to detect light in the second range of wavelengths.

4. The control method according to claim 3, subsequent to determining whether the calculated depth representative value is smaller than a second preset depth value, further comprising:

controlling, by the processor, the light source to be driven by a second driving current, which is not greater than a minimum of the first driving current, to emit light, when it is determined that the depth representative value is smaller than the second preset depth value, and proceeding to controlling the second image sensor unit to detect light in the second range of wavelengths.

5. The control method according to claim 3, subsequent to determining whether the calculated depth representative value is greater than a first preset depth value, further comprising:

executing the processor to control the light source to not emit light when it is determined that the depth representative value is greater than the first preset depth value; and registering, by the processor, the first depth map with one of the first image and the second image to generate three-dimensional point cloud data.

6. The control method according to claim 3, subsequent to determining whether the number of edge pixels is smaller than a second preset pixel number, further comprising:

executing the processor to control the light source to not emit light when it is determined that the number of edge pixels is not smaller than the second preset pixel number; and registering, by the processor, the first depth map with one of the first image and the second image so as to generate three-dimensional point cloud data.

* * * * *